US007590399B2

(12) United States Patent
Shatara et al.

(10) Patent No.: US 7,590,399 B2
(45) Date of Patent: Sep. 15, 2009

(54) TECHNIQUE FOR REDUCING MULTIPATH INTERFERENCE IN AN FM RECEIVER

(75) Inventors: Raed S. Shatara, Carmel, IN (US); Mathew A. Boytim, Kokomo, IN (US); Steven S. Langston, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 565 days.

(21) Appl. No.: 11/201,883

(22) Filed: Aug. 11, 2005

(65) Prior Publication Data

US 2007/0037538 A1 Feb. 15, 2007

(51) Int. Cl.
*H04B 1/06* (2006.01)
*H04B 7/00* (2006.01)

(52) U.S. Cl. .................. 455/272; 455/277.1; 455/277.2

(58) Field of Classification Search .............. 455/277.1, 455/277.2, 272
See application file for complete search history.

(56) References Cited

U.S. PATENT DOCUMENTS

| 4,566,133 | A | * | 1/1986 | Rambo | 455/277.2 |
|---|---|---|---|---|---|
| 4,726,073 | A | * | 2/1988 | Sessink | 455/205 |
| 5,446,922 | A | * | 8/1995 | Siwiak et al. | 455/277.2 |
| 5,517,686 | A | | 5/1996 | Kennedy et al. | |
| 5,603,107 | A | * | 2/1997 | Gottfried et al. | 455/133 |
| 5,799,042 | A | * | 8/1998 | Xiao | 375/285 |
| 6,574,461 | B1 | * | 6/2003 | Skold | 455/277.2 |
| 6,807,404 | B2 | * | 10/2004 | Meijer | 455/277.2 |
| 6,907,094 | B2 | * | 6/2005 | Matsui et al. | 375/347 |
| 6,931,081 | B2 | * | 8/2005 | Meijer et al. | 375/316 |
| 7,127,218 | B2 | * | 10/2006 | Lindenmeier | 455/101 |
| 7,221,923 | B2 | * | 5/2007 | Jimi et al. | 455/277.1 |

OTHER PUBLICATIONS

Shatara, Raed S., "Combined Switched and Phase Aligned Multi-Antenna Diversity System for Signal-Error-Reduction in Mobile Receiving Systems," University of Bundeswehr Munich, Germany, (Fall 2002) (123 pages).

* cited by examiner

*Primary Examiner*—Matthew D Anderson
*Assistant Examiner*—Wen W Huang
(74) *Attorney, Agent, or Firm*—Jimmy L. Funke

(57) ABSTRACT

A technique for reducing multipath distortion in an FM receiver, with a plurality of switchable antennas, provides a fast distortion detector that monitors a received signal for significant distortion events of less than about 15 microseconds in duration. In response to a multipath event, the output of the fast distortion detector initiates a search for a lower distortion (better quality) antenna. To prevent frequent antenna searches from causing an audible disturbance, a threshold is introduced to desensitize the fast distortion detector. Threshold decay is a function of an overall received RF signal level. A slow distortion detector is also provided that measures distortions of the received signal relating to signal quality.

16 Claims, 8 Drawing Sheets

TECHNIQUE FOR REDUCING MULTIPATH INTERFERENCE IN AN FM RECEIVER

TECHNICAL FIELD

The present invention is generally directed to a receiver and, more specifically, to a technique for reducing multipath distortion in a mobile FM receiver having a single analog front-end.

BACKGROUND OF THE INVENTION

As is well known, multipath interference is caused when two or more signal rays of an original transmitted signal converge upon a receiving antenna of a receiver at significantly different times. This misalignment or superposition of several delayed signals, which are replicas of the original signal, may cause distortion in audio recovered from the signals. Distortion caused by the multipath interference may be attributable to long delay (e.g., greater than five microseconds between signals) multipath interference or short delay (e.g., less than five microseconds between signals) multipath interference.

In a typical urban environment, RF signals experience changes in amplitude and phase due to short delay multipath. This amplitude and phase shift may result in broadband signal fades of up to 40 dB, as the receiver and its associated motor vehicle change locations. At typical highway speeds, signal fluctuation rates in the range of 100 to 1 kHz may occur. In general, long delay multipath (or frequency selective multipath) is found in areas where reflectors are greater than four to five miles away. Typically, long delay multipath occurs in cities with large buildings and in mountainous regions.

Typically, long and short delay multipath coexists and creates frequency selectivity and broadband fading, simultaneously. For example, an FM demodulated signal may contain a 1 kHz tone with a 75 kHz deviation. In such a situation, a reflected signal may have an amplitude of, for example, 0.9 units while a direct signal has, for example, an amplitude of 1 units. In the case where the time delay of the reflected signal is about 30 microseconds, the distortion attributable to the time delay may be on the order of approximately twelve percent.

In various receiver systems, antenna diversity has been implemented in conjunction with an FM receiver to reduce degraded reception performance caused by multipath interference. Antenna diversity has been accomplished through the use of two or more uncorrelated antennas. Prior art antenna diversity reception for mobile communication systems has been achieved by a number of different implementations. For example, antenna diversity has been accomplished with equal gain combiner (EGC) systems, maximal ratio combiner (MRC) systems and antenna diversity systems, such as the adaptive reception system (ARS) disclosed in U.S. Pat. No. 5,517,686, the disclosure of which is hereby incorporated herein by reference in its entirety.

EGC and MRC systems utilize signals from all antennas through a variety of combining techniques that attempt to optimize certain characteristics of the received signal. In a switched antenna diversity system, only one antenna is utilized for reception at any instant in time and, thus, the non-selected antennas do not contribute to the demodulated signal. EGC and MRC systems generally outperform switched antenna diversity systems. However, EGC and MRC systems tend to be more expensive to implement, as they require multiple receiver analog front-ends.

What is needed is an economical technique for further reducing multipath distortion in a mobile FM receiver having a single analog front-end.

SUMMARY OF THE INVENTION

One embodiment of the present invention is directed to a technique for reducing multipath distortion in an FM receiver, with a plurality of switchable antennas. The technique includes providing a fast distortion detector that monitors a received signal for distortion events less than about fifteen microseconds in duration, which indicates a multipath disturbance. A slow distortion detector is also provided that measures distortions of the received signal related to the signal quality. In response to a multipath disturbance, an output of the fast distortion detector initiates a search for a lower distortion (better quality) antenna. The search involves selecting a trial antenna and comparing its measured signal quality (provided by an output of the slow distortion detector) to that previously measured for the antenna that initiated the search (i.e., a reference antenna). An antenna having better signal quality is accepted for continued use and the search is ended. An antenna having a worse signal quality is rejected and the search is continued by selecting another trial antenna.

To prevent frequent searches that can result in audible switching noise, a threshold is introduced that desensitizes the fast distortion detector for a period following an antenna search. The threshold is decayed at a rate dependent on the overall RF signal level to provide a longer desensitized period for weak signals, which are more susceptible to disturbances. The slow distortion detector uses an averaging time that is a function of the received overall RF signal level, since, in weak signal conditions, the distortion being measured is more corrupted by noise. The averaging time may typically range between twenty-five microseconds for large signal levels to five hundred microseconds when the overall RF signal level is below a predetermined RF level. Antennas are ranked for trial selection based on their recently measured RF level. This approach helps to minimize antenna switching since an antenna having a larger signal level, which is more likely to be lower in distortion, is selected as the next trial antenna.

The slow distortion detector may implement a filter that passes frequency components of the received RF signal that are higher than about 60 kHz. According to another aspect of this embodiment of the present invention, the filter passes frequency components of the received RF signal that are less than about 100 kHz. According to one aspect of the present invention, the slow distortion detector implements a rectifier and a low-pass filter. In at least one embodiment, the slow distortion detector functions as an ultra sonic noise (USN) detector.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Today, manufacturers of automotive radios have moved from analog receiver systems to receiver systems that have increasingly incorporated more digital components within the receiver systems. As a general rule, the functions that are performed by these digital components are being increasingly implemented in digital signal processing (DSP) software.

Figure 1:
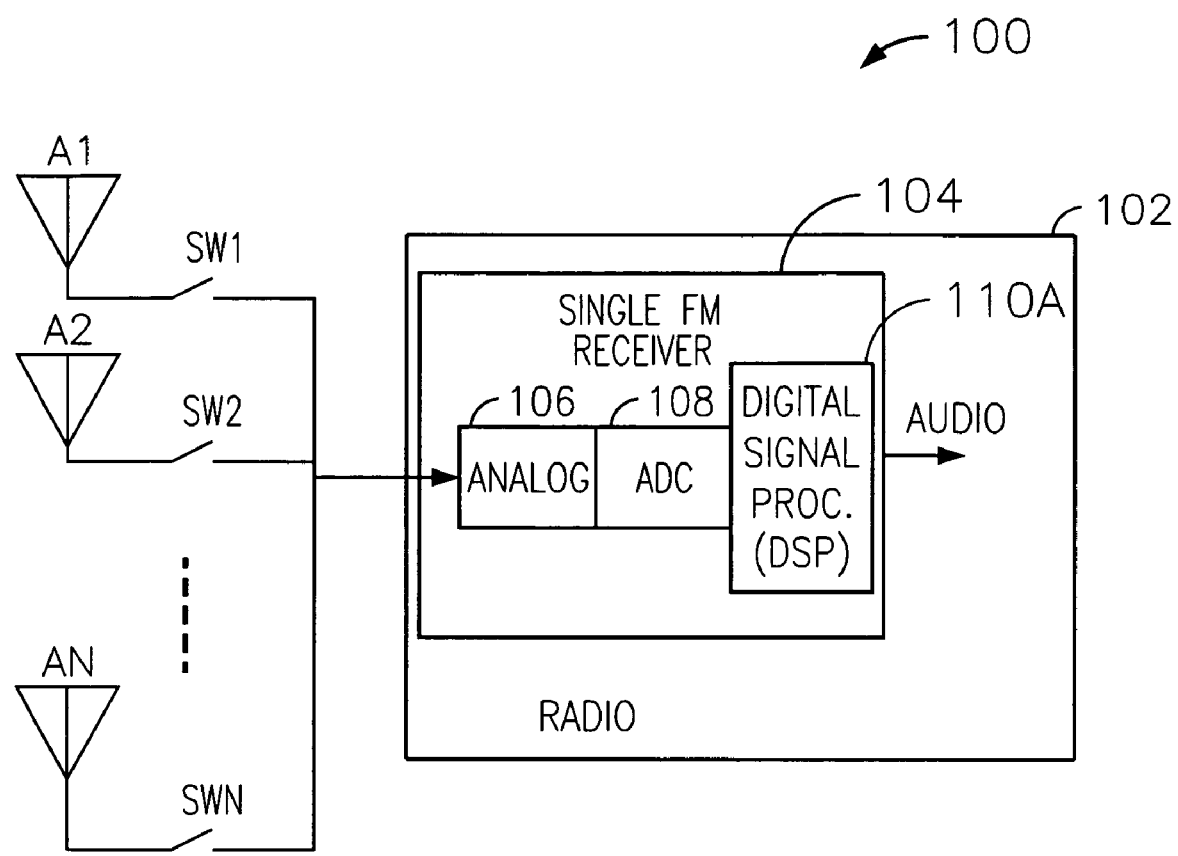
FIG. 1 is a block diagram of an exemplary radio with a single analog front-end and a digital signal processor (DSP)

With reference to FIG. 1, an exemplary receiver system 100 is shown, which includes a plurality of antennas A1, A2 through AN, which are coupled to a single analog front-end 106 (of an FM receiver 104 incorporated within a radio 102) by a different one of a plurality of switches SW1, SW2 through SWN. The output of the front-end 106 is provided to an input of an analog-to-digital converter (ADC) 108, which converts the received analog signal to a digital signal. An output of the ADC 108 is coupled to an input of a digital signal processor (DSP) 110A, which digitally processes the digital signal to provide an audio signal.

Figure 6A:
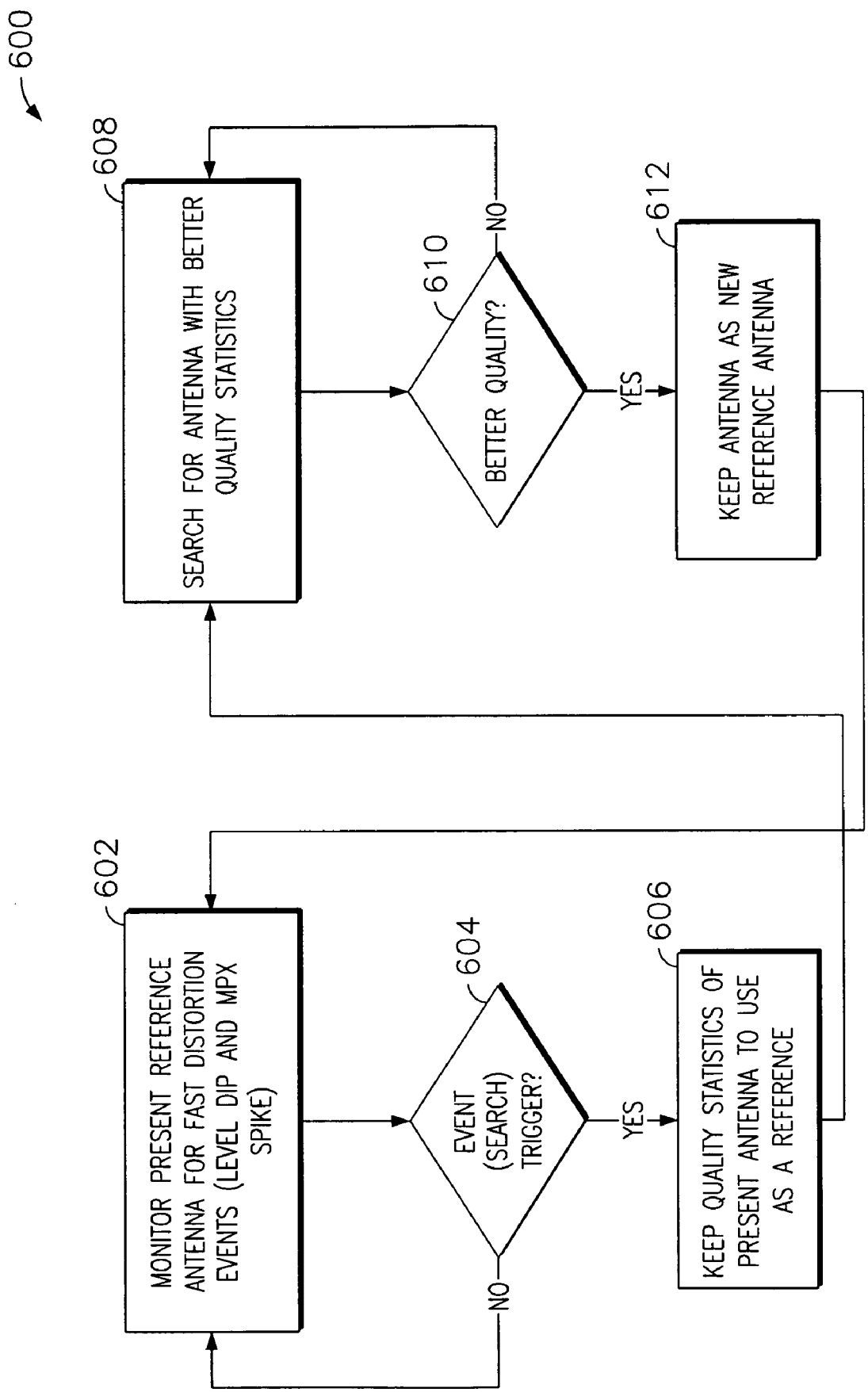
FIG. 6A is a high-level flow chart of an exemplary process for reducing multipath distortion in an FM receiver, with a plurality of switchable antennas, according to one embodiment of the present invention.

According to one aspect of the present invention, as is discussed further below, software algorithms (see FIGS. 6A-6B) executed by a DSP implement switched antenna diversity for the receiver system 100. According to another aspect of the present invention, an FM demodulator (not shown separately in FIG. 1) outputs an MPX signal, which is directed to the DSP 110A, which implements a switched antenna diversity routine 150 (see FIG. 4). In general, the routine 150 improves FM reception by reducing multipath distortion by choosing a least distorted antenna signal from one of a plurality of antennas. As noted above, switched antenna diversity is generally the simplest algorithm to implement among antenna diversity systems. In essence, the switched antenna diversity system selects the antenna with the best signal-to-noise ratio (SNR). However, because only one antenna can truly be selected at a time, the diversity algorithm must generally make the antenna selection based on incomplete knowledge.

Figure 2A:
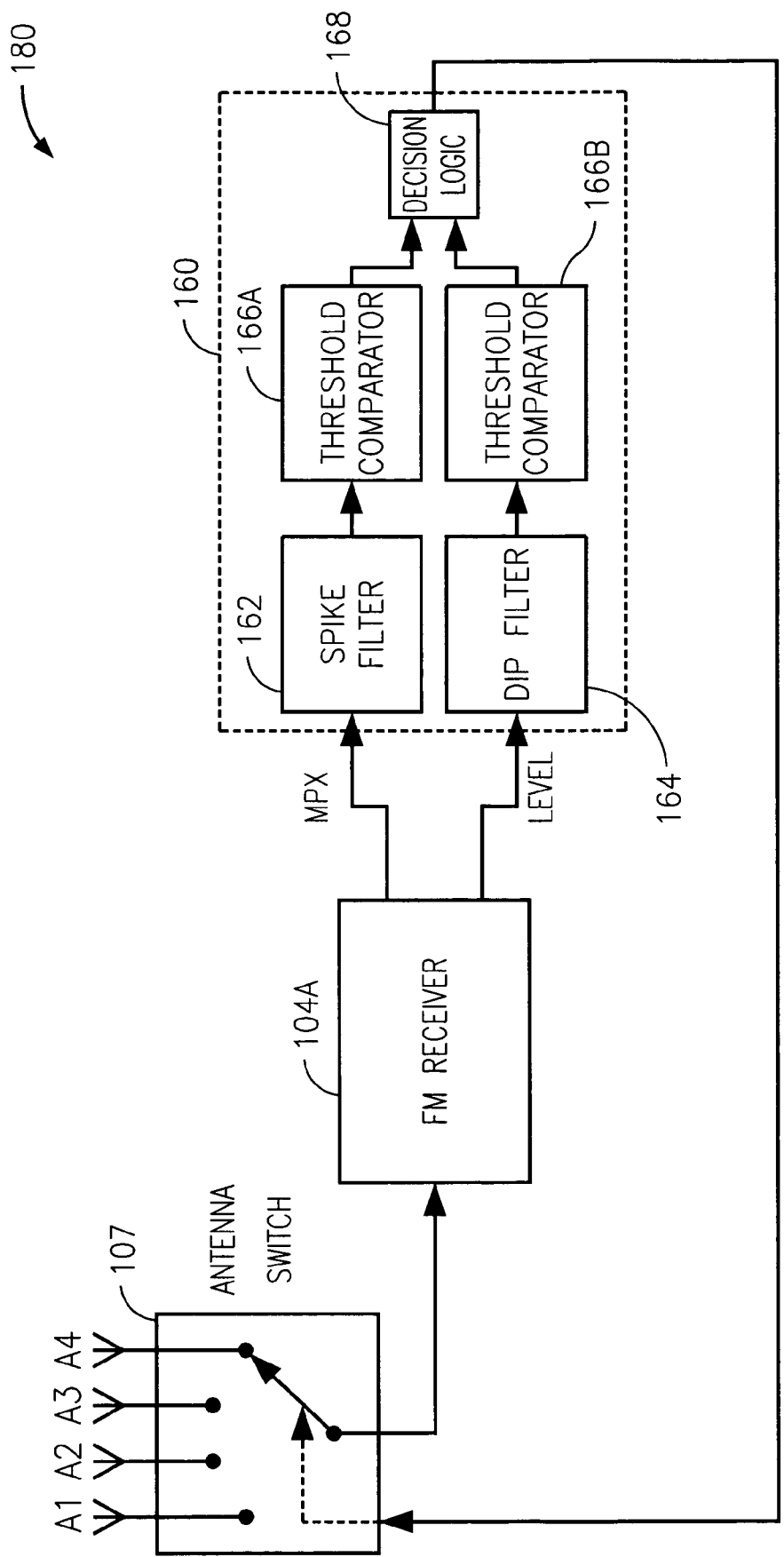
FIG. 2A is a block diagram of a receiver system implementing a classic switched diversity system.

FIG. 2A depicts an FM receiver system 180 that implements a classic switched diversity system using a fast distortion detector 160 that detects spikes, in an FM demodulator output (MPX) signal provided by an FM receiver 104A, with a spike filter 162. The detector 160 also detects negative dips, in a received RF level signal, with a dip filter 164. The outputs of the spike filter 162 and dip filter 164 are provided to threshold comparators 166A and 166B, respectively. Outputs of the threshold comparators 166A and 166B are provided to inputs of a decision logic block 168, which determines when an antenna switch 107 should be switched to another antenna, i.e., a next one of the antennas A1, A2, A3 and A4. In general, the logic 168 causes a next antenna to be selected when a spike is detected in the MPX signal coincident with a negative dip in the RF level signal, i.e., when the occurrence of spikes and dips are correlated.

Figure 2B:
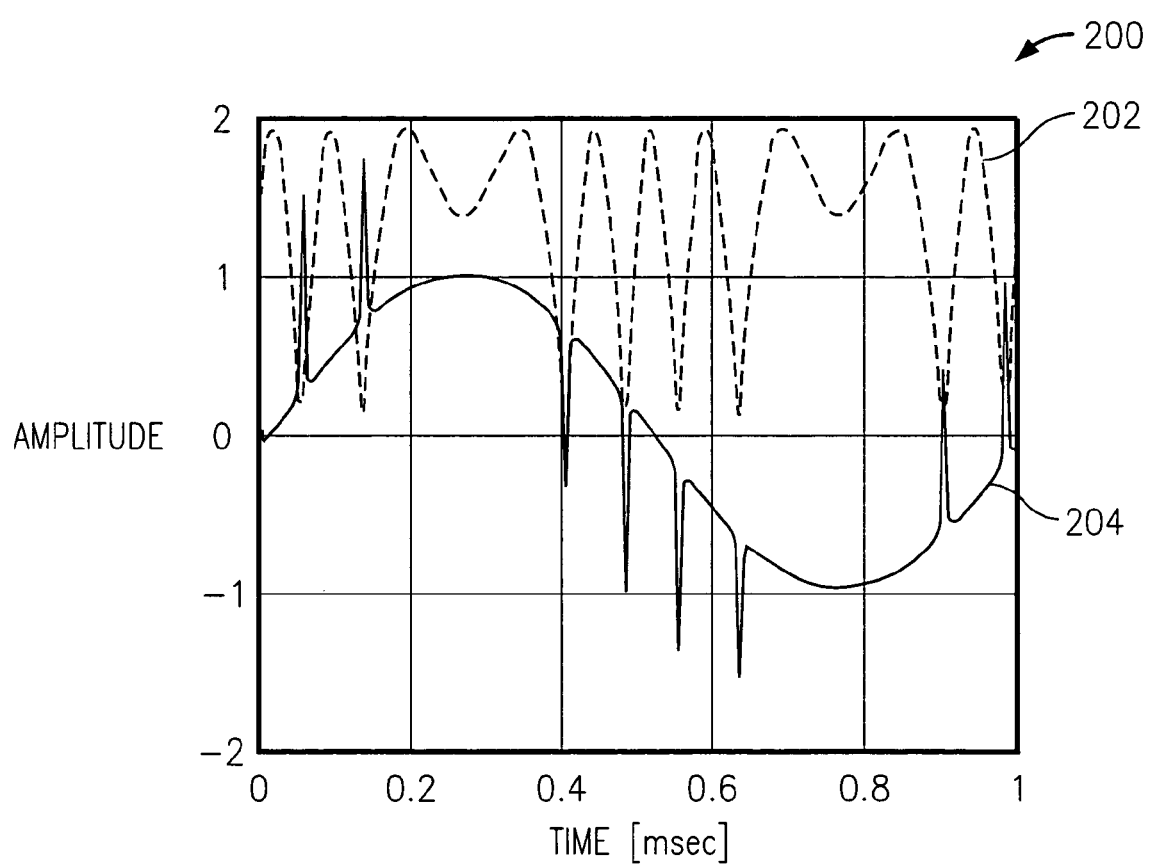
FIG. 2B is a graph depicting an RF signal level and an FM demodulator output signal (MPX) for the receiver system of FIG. 2A.

With reference to FIG. 2B, a graph 200 includes an exemplary RF level signal 202 and an exemplary FM demodulator output (MPX) signal 204. As the RF signal level 202 becomes weaker (decreases in magnitude), the received SNR degrades and the spike and dip detection may be corrupted by noise. In this case, the system 180 may increase antenna switching erroneously, which tends to cause audible switching noise in an audio signal. As such, the system 180 may fail to settle on an appropriate antenna, i.e., 'thrash' between antennas or select an antenna that does not provide the best received signal.

Figure 3A:
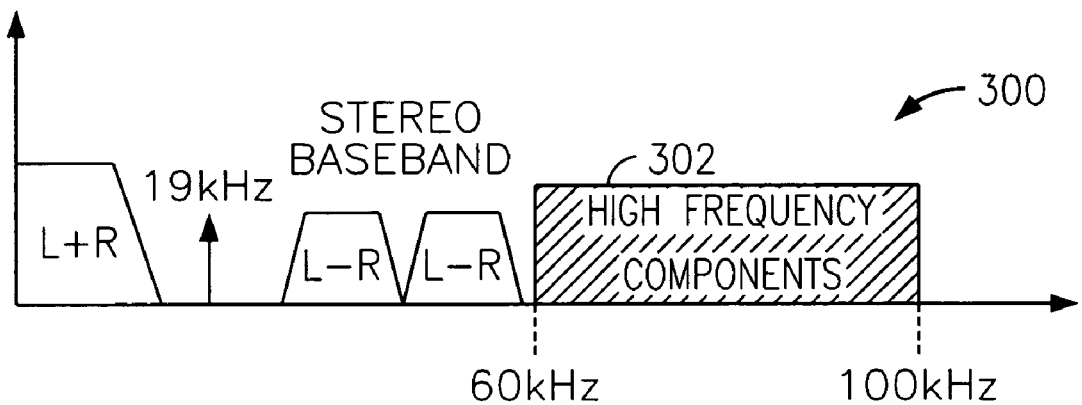
FIG. 3A is an exemplary graph of an FM baseband spectrum for an FM receiver.
Figure 3B:
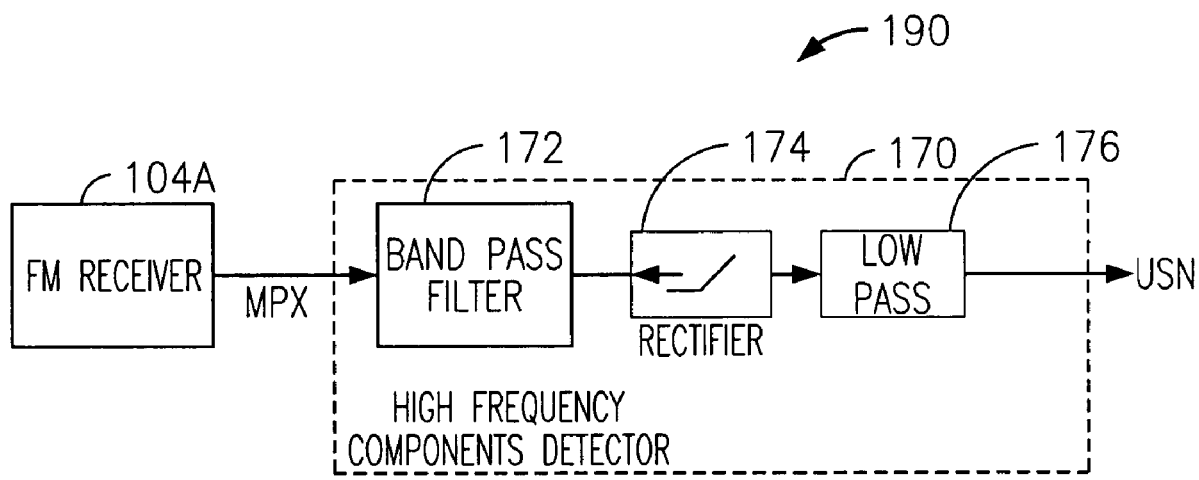
FIG. 3B is a block diagram of a relevant portion of an FM receiver system, including a slow distortion detector for detecting high-frequency components in the signals of the graph of FIG. 3A.

With reference to FIG. 3B, a receiver system 190 includes an FM receiver 104A, whose output is coupled to an input of a slow distortion detector 170. It should be appreciated that the detector 170 may be implemented in hardware or software. The detector 170 includes a filter 172, which may be, for example, a bandpass filter that passes frequencies between about 60 kHz and 100 kHz. In general, the detector 170 provides an indication of signal quality for weak RF signals, long delay multipath or adjacent channel interference. When the RF signal is weak (or in the presence of adjacent channel interference), high-frequency components 302 appear in the FM baseband spectrum, as is shown in graph 300 of FIG. 3A.

The slow distortion detector 170 averages energy of the components 302, with a relatively long-time constant, to provide an indication of the received signal quality. The less high-frequency component energy present, the better the antenna signal quality. In general, the high-frequency components can be thought of as ultrasonic noise (USN). With reference again to FIG. 3B, an output of the filter 172 may be rectified and low-pass filtered by DSP routines. According to one aspect of the present invention, higher noise levels (associated with weak signal reception) require longer time averaging for reliable statistics. This, in turn, reduces both 'thrashing' among antennas and poor antenna selection under weak signal conditions.

Figure 4:
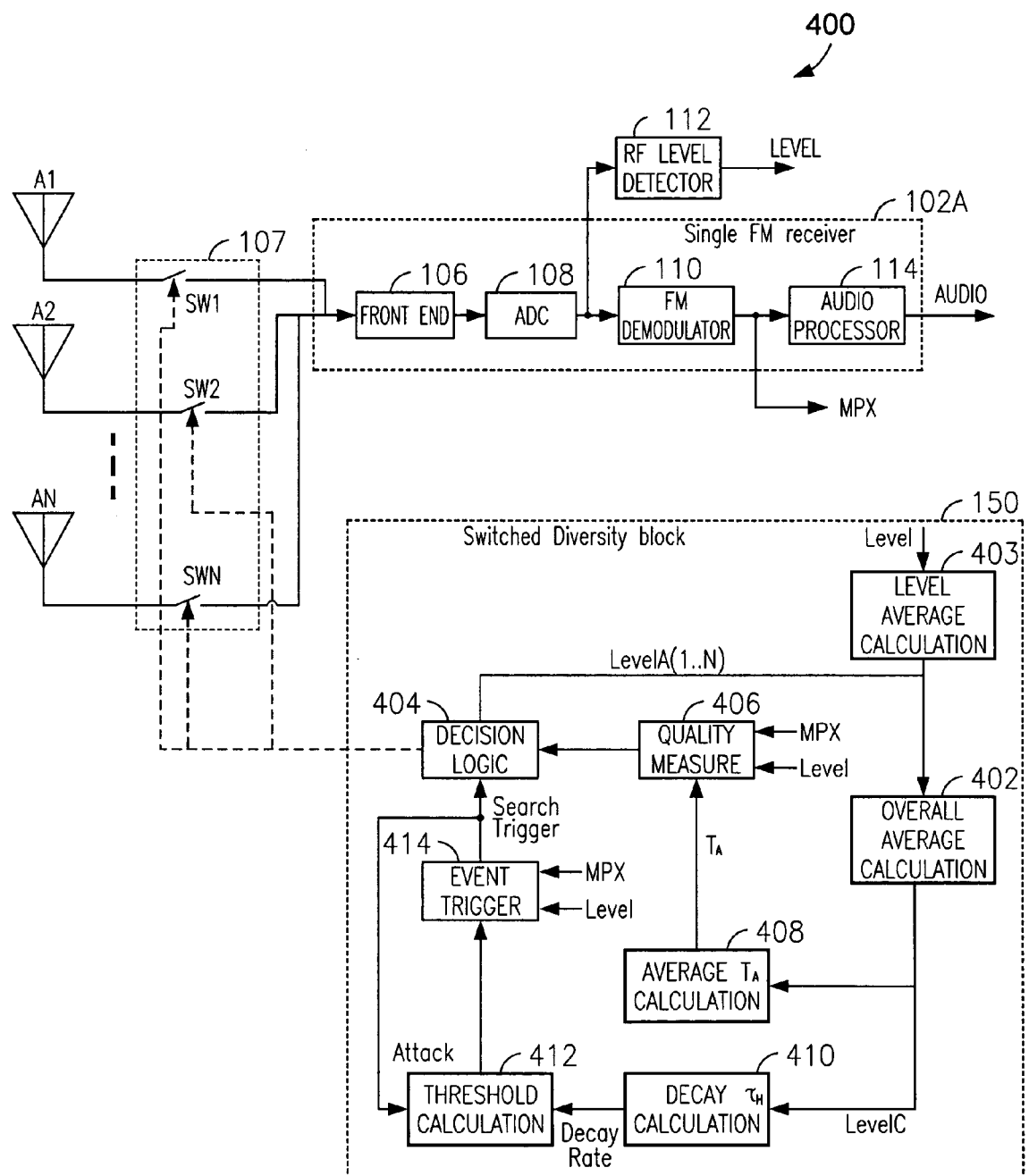
FIG. 4 is a system block diagram for an FM receiver implementing switched diversity, according to one embodiment of the present invention.

With reference to FIG. 4, a receiver system 400, configured according to one embodiment of the present invention, exhibits robust operation over a full dynamic range of a received signal. In this embodiment, implemented, for example, in software, the digitized signal output of the ADC 108 represents the pre-detected FM signal. The FM demodulator 110 performs FM detection on this signal to recover the FM multiplex (MPX) signal. The ADC signal is also level detected (AM detected) by the RF level detector 112 to obtain the received signal strength, referred to as Level. Stereo decoding and de-emphasis of the MPX signal is performed by audio processor 114 to recover the left and right audio signals. Multipath disturbances are generally manifested as distortion of the MPX signal, and dynamic variations (AC component) of the Level signal that is otherwise essentially constant for FM. The distortion of the MPX signal results in a distortion of the recovered audio. Though the audio processor 114 may employ techniques to suppress or conceal audio distortion, the function of the antenna diversity system is to minimize distortion of the MPX signal, which correspondingly minimizes audio distortion.

A separate level average calculation block 403, LevelA(n), is maintained for each antenna (n=1 to N) as a measure of its average received signal strength. The level average calculation block 403 averages the Level signal (using approximately a 6 mS time constant) to provide an update of LevelA(n) for the currently selected antenna. As a measure of the overall received signal strength, an overall average calculation block 402 is produced by averaging the LevelA(n) signals across all antennas to provide a LevelC signal. The LevelC signal is then used by a decay $\tau_H$ calculation block 410 to determine a decay time $\tau_H$ for an event trigger threshold and an average $T_A$ calculation block 408 to provide an averaging time $T_A$ for the quality measurement (see FIGS. 5A and 5B).

An event trigger is provided by an event trigger function block 414 and is based on an implementation of a fast distortion detector that correlates between RF level dip and an MPX signal spike, as shown in FIG. 2B. An event threshold provided by a threshold function calculation block 412 is introduced to slow down antenna switching, to minimize audible disturbance ("thrashing"), when excessive events, which are more frequent with weak RF signals, occur. The event trigger initiates a search for a less distorted (better quality) antenna signal, which then becomes the new favored (reference) antenna. The threshold calculation is based on prior antenna event levels that triggered the search, which provides desensitization to reduce switching. This threshold decays at a rate provided by an average decay rate function block 410 that is determined from the combined average RF level, LevelC. A slower decay (longer desensitization) is used at weak signal levels where distortion events are expected to occur more frequently.

A quality measure function block 406 derives a received signal quality, based on the MPX and RF level signals. The quality measure may include signal strength (DC or low-frequency components), AM level (AC or high-frequency components) and ultrasonic noise (USN), i.e., energy beyond the known MPX bandwidth. A quick determination of signal quality is desirable with the switched antenna system to minimize the time possibly connected to a poor antenna. However, a sufficient averaging time is needed for a confident measurement. The quality measurement averaging time is based on the combined RF level, LevelC, provided by the overall average calculation function block 402. It should be appreciated that lower RF levels require longer averaging time to obtain reliable quality statistics, due to more noise.

The decision logic function block 404 compares the quality statistics of the trial antenna (currently connected antenna) to that of the reference antenna (i.e., the reference antenna, before the search was trigged by the event trigger). The search terminates when the system 400 finds an antenna signal with better quality than the reference antenna. This selected antenna becomes the new reference antenna. By performing the quality comparison to accept a new antenna, an antenna is chosen which is less likely to encounter distortion events that would lead to another antenna search.

Switching between antennas creates some disturbance in the detected audio as a result of discontinuity between received antenna signals and from selecting an antenna with a poor signal quality. To minimize the audible disturbance, the decision logic block 404 selects trial antennas (other than the currently favored) in order of larger LevelA(n) signals recorded at the time of the triggering event. Since a larger signal level is more likely to provide better quality, a new favored antenna can be found with a minimum of antenna switching and less chance of trying a poor antenna. Reselecting the presently favored antenna, only after all other antennas have been tried, prevents exclusion of antennas from the search.

The system 400 utilizes short-term statistics (events) of the received signal, as detected by a fast distortion detector, to trigger a search for an antenna with a signal having better long-term statistics (quality) as detected by a slow distortion detector. To prevent frequent antenna searches from causing an audible disturbance, a threshold is introduced to desensitize the fast distortion detector. The threshold attacks on a triggering event value and then decays at a rate (FIG. 5A) that ranges from about 100 mS for signal strengths less than an RF level reference (e.g., a 5 μV level) to about 25 μS for strong signals. To maintain confidence in the long-term statistics, the averaging time used with the slow distortion detector (FIG. 5B) transitions from about 500 μS for signal strengths less than the RF level reference 506 to about 25 μS for strong signals.

Figure 5A:
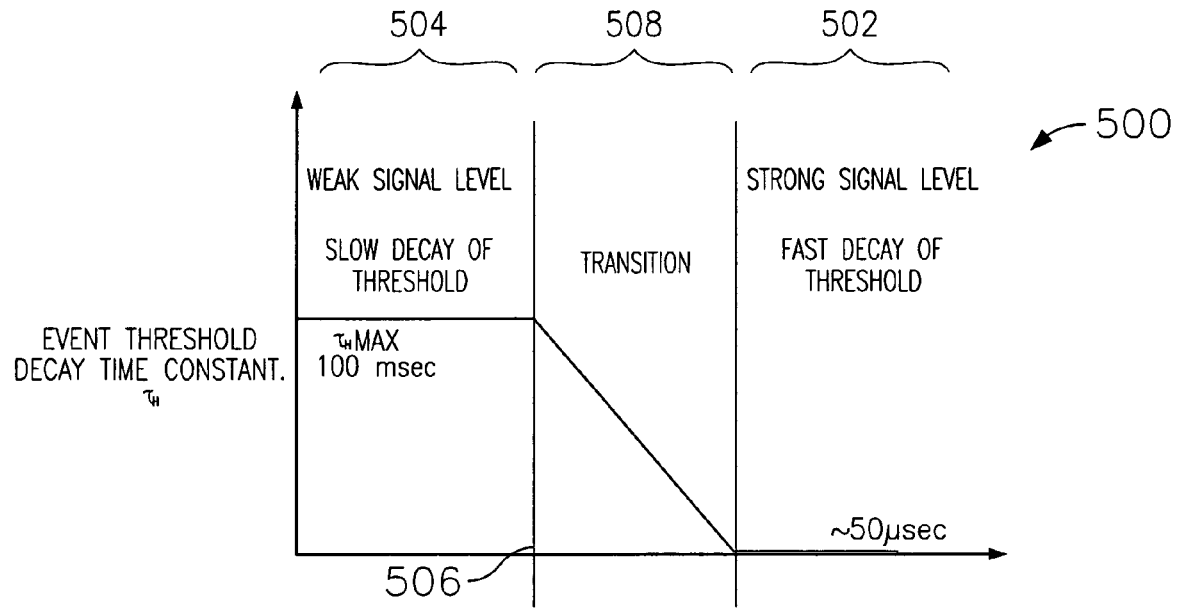
FIGS. 5A-5B are graphs depicting regions of operation for the system of FIG. 4.
Figure 5B:
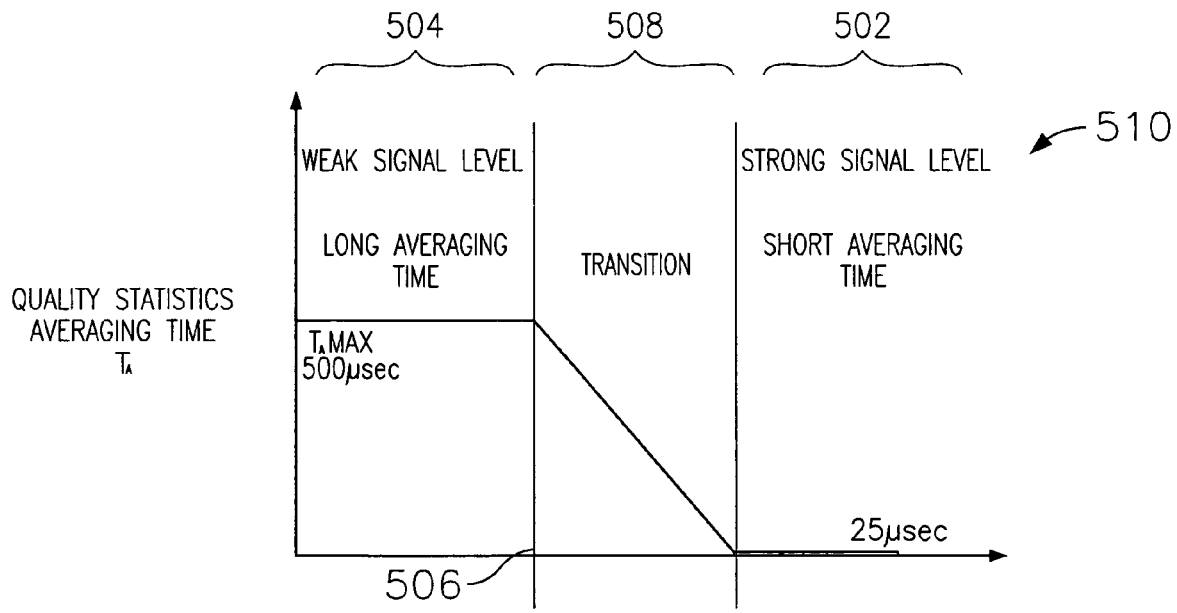

With reference to FIGS. 5A and 5B, these operation modes are further depicted in graphs 500 and 510. The operation modes include a transition region 508 that is located between a strong signal mode 502 and a weak signal mode 504. The RF level reference 506 (e.g., a 5 μV level) defines a point where the operation mode transitions between the strong signal mode 502 and the weak signal mode 504.

With reference to FIG. 6, an exemplary antenna switching routine 600, implemented according to one embodiment of the present invention, is depicted. In step 602, the DSP 110A (implementing routine 150) monitors a present reference antenna for fast distortion events (i.e., a dip in an RF level signal and an MPX signal spike). Next, in decision step 604, the DSP 110A determines whether an event trigger has occurred. If an event trigger has occurred, control transfers to step 606. Otherwise, control returns from step 604 to step 602. In step 606, the DSP 110A stores the quality statistics of the present antenna, to use as a reference. Next, in step 608, the DSP 110A searches for an antenna with better quality statistics. Then, in decision step 610, the DSP 110A determines whether an antenna with better quality has been located. If so, control transfers to step 612, where the antenna with better signal quality becomes the reference antenna, at which point control transfers to step 602. If an antenna with better signal quality is not located in step 610, control returns to step 608, where the DSP 110A continues to search for an antenna with quality statistics that are better than the current reference antenna.

Figure 6B:
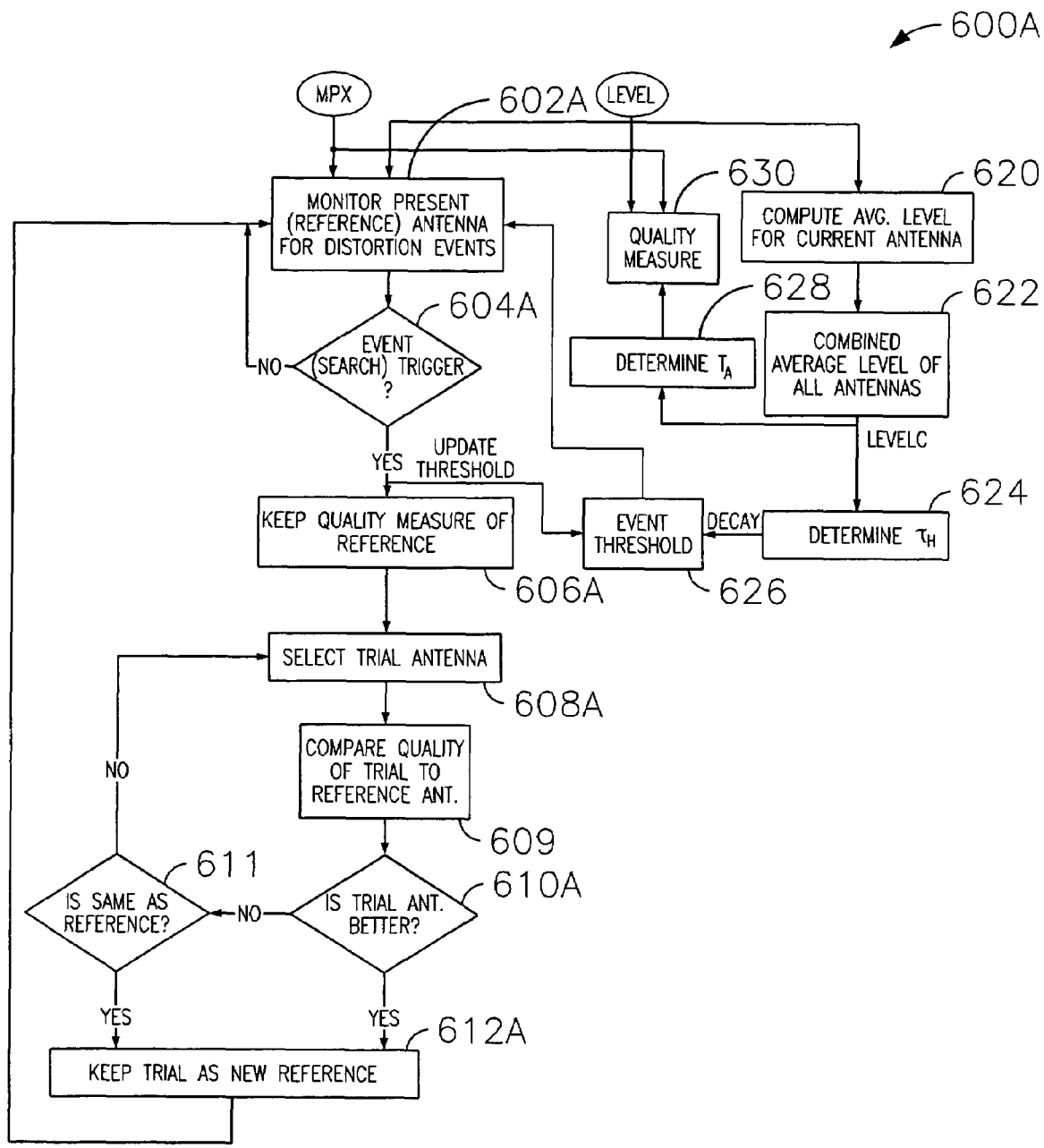
FIG. 6B is a lower-level flow chart of an exemplary process for reducing multipath distortion in an FM receiver, with a plurality of switchable antennas, according to another embodiment of the present invention.

With reference to FIG. 6B, a routine 600A is depicted that provides a more detailed process flow for implementing various embodiments of the present invention. As is shown, steps 602A and 630 receive an MPX signal value and steps 602A, 630 and 620 receive an RF level signal value. The step 602A represents a routine that monitors a present reference antenna for distortion events, which are indicated when an event threshold, provided in step 626, is exceeded. In decision step 604A, when an event trigger occurs, control transfers to step 606A, where a quality measure of the present reference antenna is stored. Next, in step 608A, a trial antenna is selected.

Then, in step 609, the quality of a signal received by the trial antenna is compared to the quality of a signal received by the current reference antenna. Next, in decision step 610A, it is determined whether the quality of the signal received by the trial antenna is better than that of the current reference antenna. If the quality of the signal provided by the trial antenna is better, the trial antenna becomes the new reference antenna in step 612A and control returns to step 602A. If the quality of the signal provided by the trial antenna is not better than that of the signal provided by the current reference antenna in step 610A, control transfers to decision step 611. In step 611, it is determined whether the quality of the signal provided by the trial antenna is better than the quality of the signal provided by the current reference antenna. If so, control transfers to step 612A, where the trial antenna becomes the new reference antenna. Otherwise, control transfers to step 608A, where a next trial antenna is selected.

The quality of the signals received by the antennas is determined by a quality measure calculation in step 630. The average level for a current antenna is determined by a calculation in step 620. The average level is provided to another calculation in step 622, which combines the average level of all antennas to provide a combined average of all antennas signal 'LevelC'. The LevelC signal value is used in step 624 to calculate an event threshold decay time $\tau_H$, which is used in step 626 to calculate the event threshold. The LevelC signal is also used in step 628 to calculate an averaging time $T_A$, which is used in step 630 to calculate a quality measure.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method for reducing multipath distortion in an FM receiver with a plurality of switchable antennas, comprising the steps of:
   providing a fast distortion detector, wherein the fast distortion detector monitors a received signal for distortion events less than about fifteen microseconds in duration;
   providing a slow distortion detector, wherein the slow distortion detector measures distortions relating to quality of the received signal;
   triggering an antenna search based upon an output of the fast distortion detector;
   selecting a trial antenna based upon a recent history of average signal levels measured on each of a plurality of antennas;
   providing a quality measure that is averaged based upon a combined average RF signal level received by all of the plurality of switchable antennas, the quality measure further comprising a determination of an average level of the trial antenna, and calculating an averaging time based upon the combined RF level, such that the averaging time is utilized to calculate the quality measure; and
   maintaining a present trial antenna as a new reference antenna or selecting another trial antenna based upon a comparison of the quality measure to a previous measurement for a current reference antenna.

2. The method of claim 1, wherein the slow distortion detector implements a filter that passes frequency components of the received RF signal that are higher than about 60 kHz.

3. The method of claim 2, wherein the filter passes frequency components of the received RF signal that are less than about 100 kHz.

4. The method of claim 3, wherein the slow distortion detector rectifies the received RF signal.

5. The method of claim 3, wherein the slow distortion detector functions as an ultra sonic noise (USN) detector.

6. The method of claim 1, wherein the slow distortion detector functions as an ultra sonic noise (USN) detector.

7. The method of claim 1 further comprising the step of calculating an event threshold decay time based upon the combined average.

8. The method of claim 7 further comprising the step of calculating an event threshold based upon the event threshold decay, such that the step of triggering an antenna search is performed when distortion events for the reference antenna exceed the event threshold.

9. The method of claim 1 further comprising the steps of adjusting a threshold for the search trigger based upon the combined average RF signal level received by the plurality of switchable antennas.

10. The method of claim 1, wherein a variable averaging time is utilized to determine the average signal levels.

11. An FM receiver, comprising:
    a front-end coupled to a plurality of antennas, wherein each of the antennas is coupled to an input of the front-end by a different one of a plurality of switches;
    an analog-to-digital converter (ADC) with an input coupled to an output of the front-end;
    an FM demodulator having an input coupled to an output of the ADC;
    a level average calculation block in communication with the ADC, and configured to provide an average level for a currently selected antenna of the plurality of antennas;
    an overall average calculation block in communication with the level average calculation block that provides an overall RF signal level;
    a fast distortion detector with an input coupled to an output of the FM demodulator, wherein the fast distortion detector initiates a search for a lower distortion antenna when a received RF signal substantially simultaneously exhibits a spike in an output of the FM demodulator and a negative dip in an RF signal level of the received RF signal that exceeds an event threshold, and wherein an event threshold decay is controlled by an overall RF level;
    a slow distortion detector, wherein the slow distortion detector measures distortions of the received RF signal relating to signal quality, wherein the slow distortion detector uses a variable averaging time that is a function of the overall RF signal level and that ranges between twenty-five microseconds to five-hundred microseconds when the overall RF signal level is below a predetermined RF level;
    an averaging time calculation block in communication with the overall RF level average calculation block, and configured to provide an averaging time used in a quality measure of the plurality of antenna elements; and
    a quality measure function block in communication with the overall average calculation block, and configured to control the averaging time of the quality measurement.

12. The receiver of claim 11, wherein the slow distortion detector implements a filter that passes frequency components of the received RF signal that are higher than about 60 kHz.

13. The receiver of claim 12, wherein the slow distortion detector implements a filter that passes frequency components of the received RF signal that are less than about 100 kHz.

14. The receiver of claim 11, wherein the slow distortion detector implements a rectifier.

15. The receiver of claim 11, wherein the slow distortion detector acts as an ultra sonic noise (USN) detector.

16. The receiver of claim 11, wherein the predetermined signal quality level corresponds to a maximum ultra sonic noise (USN) level.

\* \* \* \* \*